UNITED STATES PATENT OFFICE.

HUBERT RIECK, OF IRVINGTON, NEW JERSEY.

METHOD OF PRODUCING A MEDICINAL COMPOSITION.

992,254.  Specification of Letters Patent.  Patented May 16, 1911.

No Drawing.  Application filed December 12, 1910.  Serial No. 596,832.

*To all whom it may concern:*

Be it known that I, HUBERT RIECK, a citizen of the United States, and a resident of Irvington, in the county of Essex and State of New Jersey, have invented certain new and useful Improvements in Methods of Producing Medicinal Compositions, of which the following is a specification.

The invention relates to improved methods of producing medicinal compositions for the treatment of diabetes.

Diabetes is evidenced by well recognized symptoms and particularly by the presence of glucose, grape-sugar or animal sugar, variously designated, in the urine. The existence of diabetes is an indication that the organism is unable, to a certain degree, to assimilate carbohydrates, and it results, according to existing knowledge, from the incapability of the body, especially of the pancreas, to produce certain enzyms adapted to split up the carbohydrates and enable them to nourish the system.

My invention involves the production and introduction into the system of vegetable enzyms adapted to split the glucose or sugar into carbonic acid and alcohol, and in carrying out my invention I preferably use, in the production of my new preparation, the enzyms of culture yeast (*Saccharomyces cerevisiæ*) known under the name of zymase. These enzyms may be obtained by mixing the yeast with sand and infusorial earth and subjecting this mixture to disintegration by a rubbing action, whereby the yeast cells become torn open, and then submitting the mixture to strong pressure sufficient to effect the discharge of the juice therefrom. The cell-free yeast-press-juice thus obtained is called zymase and contains the enzyms, certain parts in zymase of albuminoid nature being known as the proper enzyms, and the remaining part of non-albuminoid nature as co-enzym. These two parts when separated from each other, as by suitable filtration, each loses its property of, when added to grape sugar in solution, causing fermentation, but when placed together again or combined, regain their ability of dividing grape-sugar into carbonic acid and alcohol. The co-enzym or liquid part of zymase deteriorates quickly and hence the value of zymase, for the purposes of my invention, becomes rapidly destroyed or lost unless a method is adopted for preserving its essential qualities or capabilities of converting grape-sugar contained in the human system into carbonic acid and alcohol. It is also essential that these qualities or properties of zymase, for the purposes of my invention, be preserved for a comparatively long period, and hence in the production of my preparation and the carrying out of my invention, I evaporate the yeast-press-juice in a vacuum at a temperature not to exceed about thirty degrees centigrade, until the same is reduced to a syrupy condition and then mix the syrupy matter with about five per cent. of its weight of a suitable powdered charcoal, preferably freshly glowed powdered charcoal originating from linden wood. The charcoal being very porous will, by capillary action, suck into its pores or cells the liquid co-enzym, and in order that all the pores or cells of the charcoal may become filled with the co-enzym I allow the mixture to stand for about three hours. I then continue to or again evaporate the now pasty mass in the vacuum to thorough dryness and granulate it, with the final result that the properties of the zymase or the enzym and co-enzym are preserved and that the fermenting qualities of the same remain unchanged for a very long period. The granulated mass composed of zymase and charcoal, prepared as described, may be dispensed in capsules, pills, tablets or otherwise and taken by patients in accordance with the directions of physicians. I prefer that the preparation be filled into capsules made of formaldehyde gelatin, which properly dissolves only in the intestines. The charcoal not only serves as a preservative of the co-enzym but in itself, exerts a beneficial effect on the human system afflicted with conditions resulting in diabetes. The zymase mixed with and preserved by the charcoal will convert the sugar into carbonic acid and alcohol.

My invention thus embodies the union with zymase of powdered charcoal and the preservation of the active value of zymase for a comparatively indefinite period.

In some instances I shall add to the preparation composed of zymase and charcoal, about an equal part of a dry yeast containing healthy yeast cells capable of development in the human system. This dry yeast may be prepared by pressing the water from yeast until the latter assumes a pasty-form, then mixing it with about five per cent. of its weight of powdered charcoal, and then drying and granulating the mixture, after which the latter will be thoroughly mixed with the primary preparation composed of the zymase, and charcoal. It is obvious however that the healthy yeast cells may be combined with the zymase and charcoal mixture in several other ways that need not be specified.

It is of very great benefit that the enzyms of zymase be preserved against deterioration and this result is accomplished by my invention.

It is recommended that from five to ten grains of the composition be taken four times a day, a dose being taken before each meal and one before retiring for the night.

What I claim as new and desire to secure by Letters Patent, is:

1. A method of producing a preparation for the treatment of diabetes comprising the production of liquid zymase from yeast, combining the same with powdered charcoal and allowing the charcoal to take up the co-enzym, and reducing the mixture to a granular condition.

2. A method of producing a preparation for the treatment of diabetes comprising the production of liquid zymase from yeast, evaporating the zymase to a syrup-consistency, mixing therewith powdered charcoal and allowing the charcoal to take up the co-enzym, and evaporating the mixture to a dry state and then granulating the same.

3. A method of producing a preparation for the treatment of diabetes comprising the production of liquid zymase from yeast, combining the same with powdered charcoal and allowing the charcoal to take up the co-enzym, and adding yeast containing healthy cells capable of development in the system, the whole being reduced to a dry granular condition.

Signed at New York city, in the county of New York, and State of New York, this 10th day of December A. D. 1910.

HUBERT RIECK.

Witnesses:
ARTHUR MARION,
CHAS. C. GILL.